(12) United States Patent
Li et al.

(10) Patent No.: US 9,002,903 B2
(45) Date of Patent: Apr. 7, 2015

(54) DATABASE SYSTEM WITH DATA ORGANIZATION PROVIDING IMPROVED BIT PARALLEL PROCESSING

(71) Applicant: Wisconsin Alumni Research Foundation, Madison, WI (US)

(72) Inventors: Yinan Li, Madison, WI (US); Jignesh M. Patel, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 204 days.

(21) Appl. No.: 13/840,249

(22) Filed: Mar. 15, 2013

(65) Prior Publication Data
US 2014/0280283 A1    Sep. 18, 2014

(51) Int. Cl.
*G06F 17/30* (2006.01)
(52) U.S. Cl.
CPC .............................. *G06F 17/30445* (2013.01)

(58) Field of Classification Search
USPC .......... 707/764, 791, 795, 796, 803, 809, 810
See application file for complete search history.

(56) References Cited

U.S. PATENT DOCUMENTS

| | | | | |
|---|---|---|---|---|
| 4,408,197 | A * | 10/1983 | Komatsu et al. | 345/27 |
| 6,894,392 | B1 * | 5/2005 | Gudesen et al. | 257/759 |
| 7,680,765 | B2 * | 3/2010 | Meijer et al. | 707/764 |
| 2005/0018587 | A1 * | 1/2005 | Petrin | 369/127 |
| 2005/0149839 | A1 * | 7/2005 | Dent | 714/800 |
| 2009/0100096 | A1 * | 4/2009 | Erlichson et al. | 707/104.1 |
| 2010/0293202 | A1 * | 11/2010 | Kim et al. | 707/803 |
| 2012/0185753 | A1 * | 7/2012 | Chen et al. | 714/773 |

* cited by examiner

*Primary Examiner* — Cam-Linh Nguyen
(74) *Attorney, Agent, or Firm* — Boyle Frederickson, S.C.

(57) ABSTRACT

A database system provides vertical or horizontal pre-packing of database data elements according to a size of physical processor words in order to obtain improved parallel processing at the bit level. After processor words are populated with data from multiple data elements of the database, query operations are used which may simultaneously process the multiple data elements in each data word simultaneously in the computer arithmetic logic unit.

20 Claims, 4 Drawing Sheets

DATABASE SYSTEM WITH DATA ORGANIZATION PROVIDING IMPROVED BIT PARALLEL PROCESSING

STATEMENT REGARDING FEDERALLY SPONSORED RESEARCH OR DEVELOPMENT

This invention was made with government support under 1110948 awarded by the National Science Foundation. The government has certain rights in the invention.

CROSS REFERENCE TO RELATED APPLICATION

Background of the Invention

The present invention relates to computerized database systems and in particular to a system that organizes data and processes queries for improved parallelism at the bit level.

Database systems combine computer hardware and software to facilitate the management of and selective access to large amounts of data held in the database structure. An example database structure may hold data elements organized in logical rows, with each row being organized as a list of columns where the columns define a common category of the data elements and the rows link data elements related to some common entity. For example, a database of students might have multiple rows associated each with different students and multiple columns denoting different information about the students such as: student name, student matriculation year and the like.

Access to a database structure is commonly done by means of one or more "queries" Which may define a query condition (for example, as in an SQL WHERE clause). The query operates on multiple data elements of one or more columns across multiple database rows to identify the data elements relevant to the query. The application of the query to the data elements is termed a "scan" and provides a query result identifying rows (for example, students) meeting the query conditions. In the above example of a database of students, a query may seek to identify all students having matriculation year greater than 2015 and return a query result listing individual student names.

There is considerable interest in increasing the speed of a query scan, particularly for large database structures. Considerable speed gains can be had by placing the database structure entirely or in part within high-speed random access memory. Additional speed gains can be obtained by using processors having a faster clock speed. Speed gains normally attendant to increases in processor word size may be less effective in increasing query scan speed to the extent that the database elements do not match and thus do not take advantage of larger processor word size.

SUMMARY OF THE INVENTION

The present invention provides speed gains by making better use of existing processor words, a technique which is particularly useful for very large processor words provided in single instruction multiple data (SIMI)) computers by pre-organizing the data elements of the database to better fill the processor word and to provide for query software that performs bit parallel processing of multiple data elements in the processor word. In one embodiment, the invention selects between two different organization techniques (horizontal bit parallel—HBP structure and vertical bit parallel—VBP structure) based on an assessment of the relative strength of these different approaches for particular database structures and queries.

In one embodiment, the invention provides a database system having a data storage device for bolding database data elements and having a processor executing a program to:

(a) receive input indicating a projected type of database activity to be conducted on the database elements;

(b) based on the input, read the database data elements from a first memory structure in memory and reorganize the database data elements in a second memory structure in memory in a selected one of a horizontal bit parallel structure and vertical bit parallel structure as determined from the received input; and (c) execute queries on multiple data elements in parallel by bit parallel processing of the multiple logical rows of data using the arithmetic logic unit.

The horizontal bit parallel structure provides multiple logical rows and columns and organizes multiple data elements in each logical row so that the logical row may be receivable in its entirety by an arithmetic logic unit of the processor for execution by the arithmetic logic unit of bits of the multiple data elements in parallel. Conversely, the vertical bit parallel structure provides multiple logical rows and columns and organizes multiple data elements in multiple logical columns so that bits only of a single order of the organized data elements are in each logical row, again, so that the logical row may be receivable in its entirety by an arithmetic logic unit of the processor for execution by the arithmetic logic unit of all of the bits of the single order of the multiple data elements in parallel.

It is thus a feature of at least one embodiment of the invention to improve bit level parallel processing of database queries. It is a further feature of at least one embodiment of the invention to vary the organizational structure of the data depending on particular characteristics of the database operation to match the particular advantages of different data organizations.

The bit parallel processing of the query may apply at least one argument of a length, matching a length of the logical row to data of multiple data elements, simultaneously, to all data elements in the logical row.

It is thus a feature of at least one embodiment of the invention to provide increased utilization of processing word of the ALU.

The bit-parallel processing may generate a result of length equal to the length of the logical row and having a single bit corresponding to each data element of the logical row and indicating whether the data element meets the query condition.

It is thus a feature of at least one embodiment of the invention to provide a compact single word result from the multi-word bit parallel processing for efficient data transfer.

The data elements, when organized in a horizontal bit parallel structure, may be organized in a logical row with bits in a sequence according the order of the bit with all bits of each data element preceded by a delimiter bit.

It is thus a feature of at least one embodiment of the invention to provide room for bit shifting or carry operations that facilitate the evaluation of horizontal bit parallel structures.

Multiple adjacent data elements when organized in a horizontal bit parallel structure may not be sequential in a database order of the data in the logical row. In one embodiment, multiple adjacent data elements within a data word may be each k+1 greater in database order from a previous data element where k is a bit length of the data elements.

It is thus a feature of at least one embodiment of the invention to change the ordering of data elements within the logical word to facilitate a simple shift and combine operation to obtain a single word result vector with the bits in correct database order.

The data elements when organized in a vertical bit parallel structure may be arranged in adjacent logical columns so that bits of sequential data elements are in database order in the logical row.

It is thus a feature of at least one embodiment of the invention to provide a data structuring that maximizes use of the processor word for data element data. The vertical bit parallel structure eliminates the practical need for delimiter bits.

The bit parallel processing of the query uses only operations that do not require bit carry or bit shifting.

It is thus a feature of at least one embodiment of the invention to provide a bit parallel processing system that works with current single instruction, multiple data architectures in which carry or shift operations across the entire input register may not be accommodated.

The bit parallel processing of the vertical bit parallel structure by the query may sequentially process logical rows holding the more significant bits of the data elements and proceed in order toward processing logical rows holding less significant bits of the multiple data elements. Further, the bit parallel processing may stop before evaluation of a query condition on all logical rows of given data elements ("pruning") when applying an argument to a given logical row precludes the possibility of the query condition being met in the processing of later logical rows.

It is thus a feature of at least one embodiment of the invention to accelerate bit parallel processing by terminating execution when no further information is needed.

The database system may further monitor the pruning to selectively separate ranges of bit orders of the multiple data elements of the logical words into separately pre-loadable increments of data so that an earlier stopping causes a separation into a smaller range of bit orders and a later stopping causes a separation into a larger range of bit orders.

It is thus a feature of at least one embodiment of the invention to modify the reordering of the data to promote efficient memory access bandwidth in the case were calculations may be truncated for the evaluation of all bit orders These particular objects and advantages may apply to only some embodiments falling within the claims and thus do not define the scope of the invention.

DETAILED DESCRIPTION OF THE PREFERRED EMBODIMENT

Figure 1:
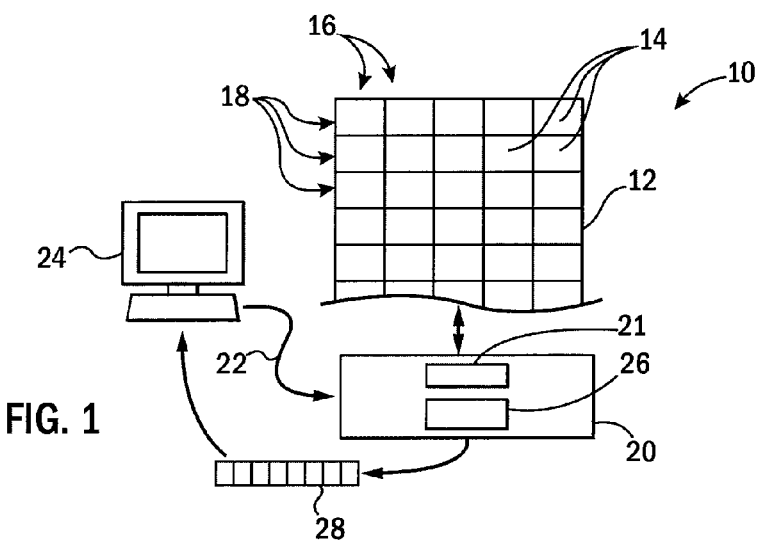
FIG. 1 is a simplified block diagram of a database system showing the principal elements of the present invention including a data preprocessor and a bit parallel processor generally implemented by a combination of software and hardware.

Referring now to FIG. 1, the present invention operates in the context of a database system 10 providing for a database structure 12 holding data elements 14 organized in a logical structure. In the following example, the logical structure is represented by columns 16 each designating an attribute of the data elements 14 in those columns and rows 18 linking the data elements 14 of different attributes in records each related to a common entity. This logical structure is generally independent of the physical storage of the data elements.

Generally, the invention provides for a database engine 20 implemented by a combination of software and hardware whose functions can be broadly classed into categories. First, the database engine 20 manages the data elements 14 of the database structure 12 by adding, removing or editing data elements 14 of the database structure 12. In this regard the database engine 20 maps the logical structure described above to the physical structure of storage media such as disk drives and memory. In the present invention, this management function of the database engine 20 is augmented with a data preprocessor 21 reorganizing the physical structure of the data elements as will be described below.

Second, the database engine 20 executes queries 22 received from a user 24, for example, as may be input from a terminal or received from a remote user over the Internet. These queries request selected data elements 14 from the database structure 12 based on query conditions describing, for example, numeric ranges or logical relationships used to make the selection. The results 28 of the query may then be returned to the user 24 the results typically identifying relevant records. In the present invention, this query function uses a bit-parallel processor 26, being a combination of hardware and software as will be described in detail below.

It will be appreciated that the database engine 20 may also provide for management of the logical structure of the database structure 12, for calculations on data elements identified in a query and for other common database features that will not be described in detail in this application but as is generally understood in the art.

Figure 2:
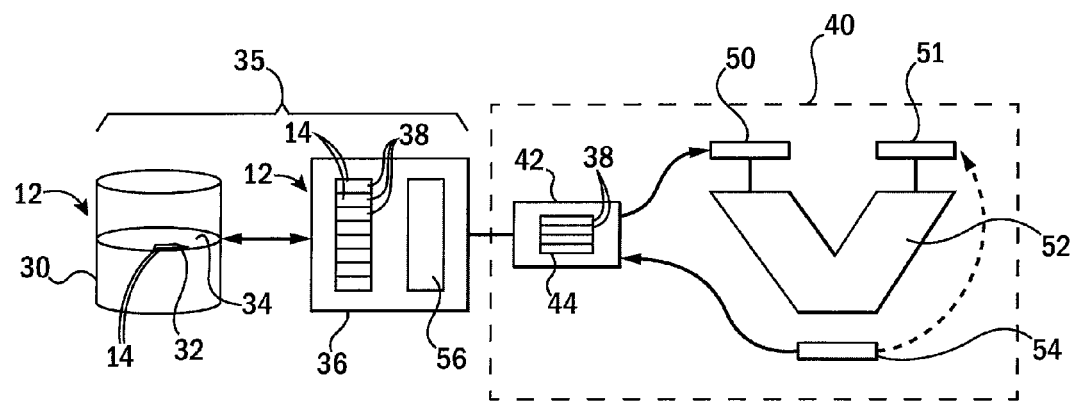
FIG. 2 is a simplified hardware block diagram of an electronic computer showing selected details of the processor hardware for illustration of the bit parallel processor.

Referring now to FIG. 2, physically, the database structure 12 may be stored in a memory system 35, for example, one or more disk drives 30 or large solid-state memories 36. As so stored, the data elements 14 have a physical organization, for example, arranged as a stripe 32 on a disk platter 34 of the disk drive 30 or EIS memory words 38 of solid-state memory 36 such as may affect the access speed of the data elements 14. For example, data elements on a single stripe 32 are accessed more rapidly than those that require a read head move. Similarly data elements 14 in a single memory word 38 or at adjacent addresses of memory words 38 may generally be accessed more quickly using conventional caching techniques. It will be appreciated that the data elements may be stored on one or more different physical devices and may be moved between physical devices and locations on a given physical device.

Data elements 14 in the memory system 35 may be accessed by a computer processor 40 typically having one or more levels of cache 42. As is understood in the art cache 42 may import cache blocks 44 of multiple data words 38 in a prefetch process intended to reduce the delay in accessing memory. Data elements 14 in a common cache block 44 may thus have a lower latency than data in different cache blocks 44. Data accessed from the disk drive 30 is normally passed through a buffer in solid-state memory 36 and then transferred to the cache 42 in a similar fashion.

Data words 38 received by the processor 40 from the cache block 44 may be loaded into a processing register 50 as an argument to an arithmetic logic unit (ALU) 52. The ALU 52 may operate on the argument of register 50 possibly together with a second argument in second register 51 and a result may be output to a register 54 and returned to the cache 42. The ALU 52 may perform standard Boolean-type operations including AND, OR, EXCLUSIVE OR, INVERT and the like as well as arithmetic operations such as ADD and COMPARE. It will be appreciated that the many other elements of a modern computer processor are omitted for clarity as would be understood to those of ordinary skill in this art including multiple other registers and addressing circuitry; and specialized hardware circuits, such as hardware multipliers, dividers, pipelines and speculative execution elements may also be present in the processor 40.

The size of the register 50 represents a "processing word", the latter being defined herein generally as the number of bits that may be received by the ALU 52 for processing according to a single instruction. For example, the processing word represents the largest word that may be operated on by a single inversion instruction. The bit width of the registers 50 will generally match the width of data words 38 of the cache 42 and a memory system 35 as effectively addressed by the processor 40.

The operation of the processor 40 in processing the data elements 14 will be controlled by the program instructions of a program 56 generally in a separate portion of memory system 35 depending on the particular computer architecture. As is understood in the art, the program 56 may also be executed on the ALU 52 according to techniques well understood in the art. The program 56 in this respect provides for the general functional elements of the database engine 20 including the data preprocessor 21 and the bit-parallel processor 26 as will now be described Referring now to FIG. 3, the data preprocessor 21, in a first stage of operation, may receive query-type information 60 from a user 24 or a profiling program 25. The query-type information 60 may either directly indicate a preferred type of physical data structure (horizontal bit parallel—HBP and vertical bit parallel—IMP) as will be discussed below, as selected by the user or by a profiling program 25. The profiling program 25 may analyze the user query according to the relative advantages of these two types of physical data structures (discussed below) before execution of the query or may operate during run time empirically to determine a preferred organizational structure. For example, the profiling program 25 may during a first test period vary the physical data structures and then adopt that which provides greatest performance measured, for example, by execution time, cache misses, instruction execution speed and the like. For example, when it appears that speed limit is imposed by data lookup, which affects preprocessing as will be described, HBP may be employed, whereas when the speed limit results from processing performance by the ALU 52 VBP may be employed.

This query-type information 60 is received by the data preprocessor 21 which uses this query-type information 60 to determine how to reorganize data elements 14 of the database structure 12 in a first portion of memory system 35 into a second portion of memory system 35, the reorganization configuring the data elements 14 in either horizontal bit parallel (HBP) structure 62 or vertical bit parallel (VBP) structure 64.

In an HBP structure 62 multiple data elements 14 are placed in single data words 38 with their bit ordering preserved in order in adjacent bits. Thus, for example, when an eight-bit data element 14 is placed in a larger data word 38 comprising, for example, 32 bits, each of the eight bits in adjacent sequential locations in the data words 38 will retain normal ordering from high (most significant bit) to low (least significant bit) bit order. As used herein the term bit "order" refers to the exponent value position ("place") of the bit of the data representation. In this example, the bit orders for an eight-bit data element 14 will range from 0 to 7. In the FIBP structure 62 successive data words 38 contain data from wholly different data elements 14.

In contrast, in VBP structure 64 portions of multiple data elements 14 are contained in each data word 38, but the entire data elements 14 are split among multiple data words 38 so that high order bits of multiple data elements 14 are held in a first data word 38 and successive orders of bits for the same data elements 14 are contained in successive data words 38. In the VBP structure 64, successive data words 38 contain different orders of bits from the same data elements 14.

As stored in an HBP structure 62 or a VBP structure 64, the data elements 14 may then be received by the database engine 20 for processing by the bit-parallel processor 26 according to a receive query 22, as will now be described, to provide a result 28.

HBP Processing

Figure 4:
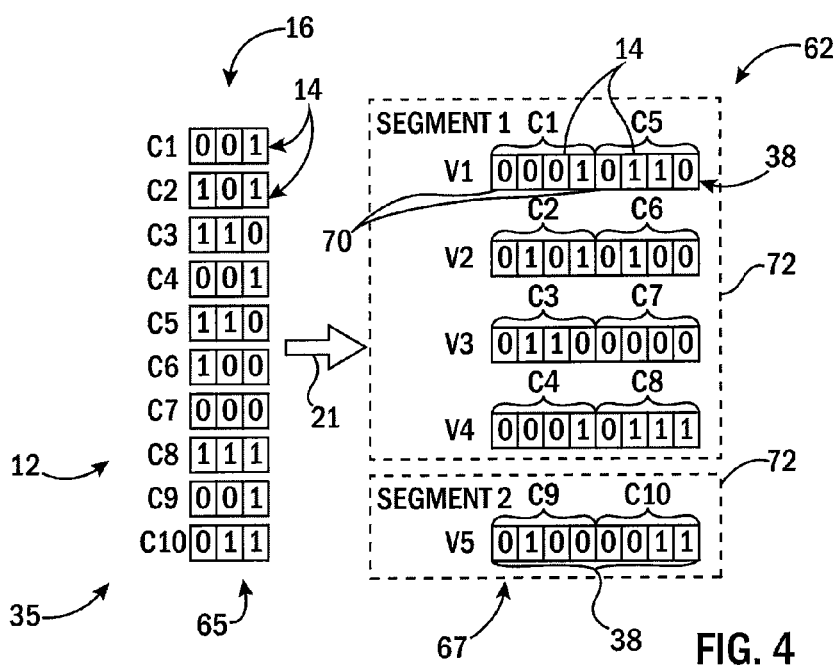
FIG. 4 is a data structure diagram showing arrangement of the data according to a horizontal bit parallel structure.

Referring now to FIG. 4, an example process will be described with respect to a simplified database structure 12 having data elements 14 that are three bits in length and thus which can represent values from 0 to 7 (decimal). Successive data elements 14 in a first memory structure 65 of memory system 35 of the database structure 12 are shown in logical order of a column with a column order according to labels c1-c10. This logical ordering need not match the actual physical ordering of the data elements 14 in memory structure 65.

Figure 3:
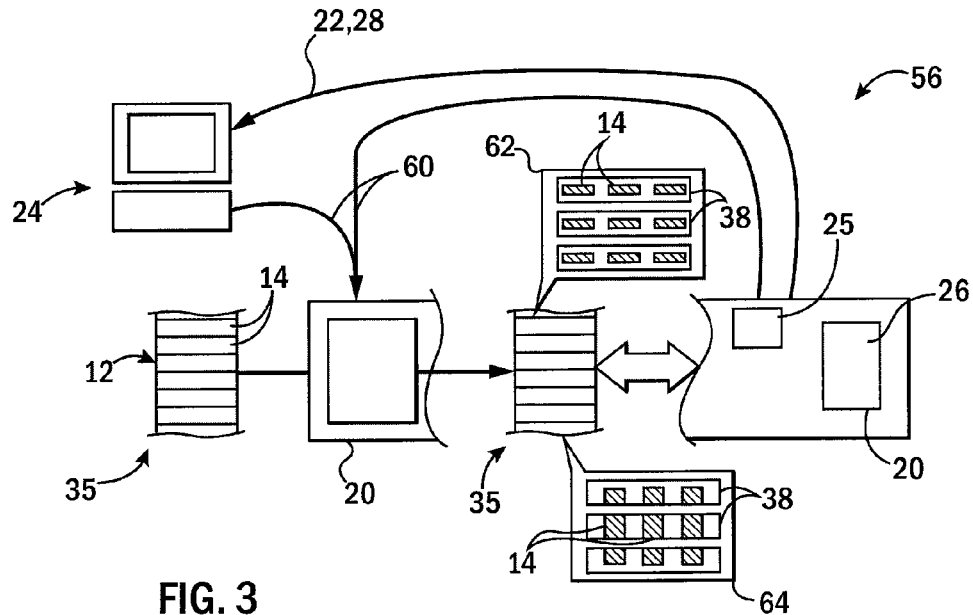
FIG. 3 is a diagram showing a flow of data through the data preprocessor and parallel processor.

Referring also to FIG. 3, in horizontal processing using the HBP structure 62, the data preprocessor 21 packs two data elements 14 into each data word 38 (assumed to be eight bits in width in this example) of a second memory structure 67. In this case the memory structure 67 accurately represents the physical ordering of the data elements 14 in each data word 38 and the address proximity of multiple data words 38.

In this packing, an optional spacer bit 70 precedes each data word and will be used to hold a result of the query scan as will be described below. More generally, the number of data elements 14 in each data word 38 will be w/k+1 where k is the length of the data elements 14 and w is the length of the data word 38.

The data words 38, each holding multiple data elements 14, are collected into segments 72 which contain k+1 data words 38. For convenience in calculation, sequential data elements 14, with respect to the logical ordering of the data elements 14 in the database structure 12, fill the data words 38 of the segments 72 in database order in a sequence of top to bottom then left to right so that the first data word 38 holds c1 and c5 and the second data word 38 holds c2 and c6 and so forth. The data elements 14 are stored in contiguous data words 38 within a segment 72 to facilitate hardware pretetching using a cache structure.

During a scan, a data word 38 holding two data elements 14 (in this example) is passed to register 50 and the two data elements 14 are simultaneously processed by the ALU 52 as embedded in a single processor equal to the width of the data word 38.

In the steps of this example, bit-parallel processing of the data word 38 in register 50 by the ALU 52 is shown in TABLE I for a query condition of checking whether data elements 14 are less than the decimal number "5". In this example, the data word 38 contains two data elements 14 having binary values of 0001 and 0110 (c1 and c5). The decimal value of c1 is 1 which accordingly should test true in the scan and the decimal value of c5 is 6 which should test false. In the following example, the data word 38 is shown in the first row and first column of TABLE I as the value X. The later columns show this process for other data words 38 stored in horizontal form and will not be discussed but are offered only for completeness.

Alternative bit-parallel queries may be implemented in this manner, for example, for additional query conditions and formulas provided below:

Inequality $$Z=((X \oplus Y)+01^k01^k01^k) \wedge 10^k10^k10^k.$$

Equality $$Z=\neg((X \oplus Y)+01^k01^k01^k) \wedge 10^k10^k10^k.$$

Less that (as described above)

$$Z=(Y+(X \oplus 01^k01^k01^k)) \wedge 10^k10^k10^k$$

Less than or equal $$Z=(Y+(X \oplus 01^k)) \wedge 10^k10^k10^k$$

These and other techniques for bit-parallel processing in a single computer word are described in the paper L. Lamport.

TABLE I

|  | (c1; c5) | (c2; c6) | (c3; c7) | (c4; c8) | v5(c9; c10) |
|---|---|---|---|---|---|
| X = | $(0001\ 0110)_2$ | $(0101\ 0100)_2$ | $(0110\ 0000)_2$ | $(0001\ 0111)_2$ | $(0100\ 0011)_2$ |
| Y = | $(0101\ 0101)_2$ | $(0101\ 0101)_2$ | $(0101\ 0101)_2$ | $(0101\ 0101)_2$ | $(0101\ 0101)_2$ |
| mask = | $(0111\ 0111)_2$ | $(0111\ 0111)_2$ | $(0111\ 0111)_2$ | $(0111\ 0111)_2$ | $(0111\ 0111)_2$ |
| X ⊕ mask = | $(0110\ 0001)_2$ | $(0010\ 0011)_2$ | $(0001\ 0111)_2$ | $(0110\ 0000)_2$ | $(0011\ 0100)_2$ |
| Y + (X ⊕ mask) = | $(1011\ 0110)_2$ | $(0111\ 1000)_2$ | $(0110\ 1100)_2$ | $(1011\ 0101)_2$ | $(1001\ 1001)_2$ |
| Z = (Y + (X ⊕ mask)) ⊕ ¬ mask = | $(1000\ 0000)_2$ | $(0000\ 1000)_2$ | $(0000\ 1000)_2$ | $(1000\ 0000)_2$ | $(1000\ 1000)_2$ |

At a first step, the ALU register 51 is loaded with a Y value representing a data word 38 equal to the processor word that will be used to effect this parallel bit processing and which represents the binary value of the query scan ("5") duplicated for each data element (two times in this example). This Y value is precomputed at the time of the query and thus does not meaningfully affect execution speed. A mask value is also precomputed which will be used to isolate the spacer bits 70 at the conclusion of the calculation shown here as the binary value 0111, again duplicated for each of the data elements 14.

At a first step of the process, the ALU 52 computes an EXCLUSIVE OR between the X value and the mask value producing a data word 38 in register 54 of 0110 0001. This mask value is then loaded into the register 50 and added to the Y value in register 51 to produce the data word 38 of 1011 0110 in register 54. This result is then moved to register 50 and logically ANDed with the inverse of the mask value to produce a value of 1000 0000. It will be seen that the values of this result at the locations of the spacer bits 70 indicate the results of the query scan for this data word 38, being a one if the query test is true (that is, the number is less than five) and a zero if the query test is false.

This process is repeated for each of the data words 38 in the segments 72, and results for each repetition are compressed into a single eight-bit vector by successive shifting and ORing of the shifted values together to produce a bit vector of length equal to the data word 38 for each bit and provides the results of the query (that is, "1" for the query condition being satisfied and "0" for the query condition not being satisfied) where the positions of the "1" values indicate address offsets of the rows 18 with respect to the address of the segments 72 for the rows 18 satisfying the query condition. It will now be understood that the packing arrangement shown in FIG. 4 simplifies the shifting and ordering process to create this bit vector that may be used as an index to recover those records if desired from the database structure 12.

"Multiple Byte Processing with Full-Word Instructions" Commun. ACM 18 (8): 471-475, 1975 hereby incorporated by reference . . . .

Clearly these operations can be combined for more complex queries and the conditions of "Greater Than" and "Greater Than or Equal To" may be implemented by swapping X and Y operators.

VBP Processing

Figure 5:
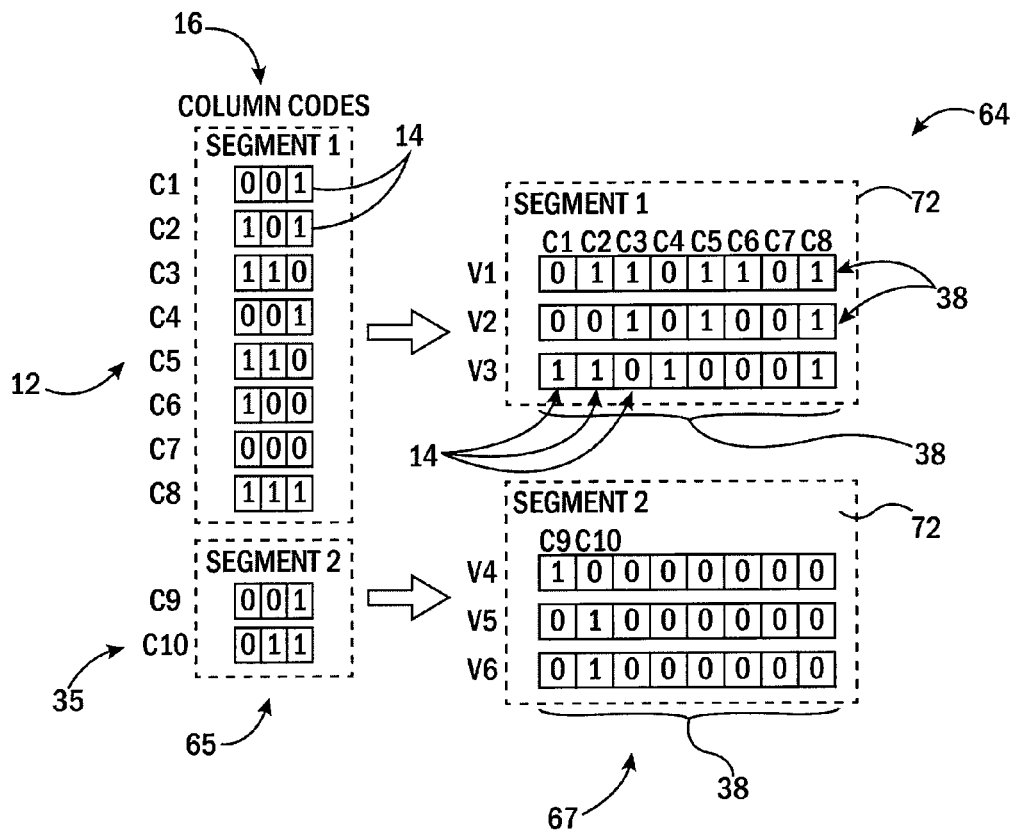
FIG. 5 is a figure similar to that FIG. 4 showing arrangement of the data according to a vertical bit parallel structure.
Figure 7:
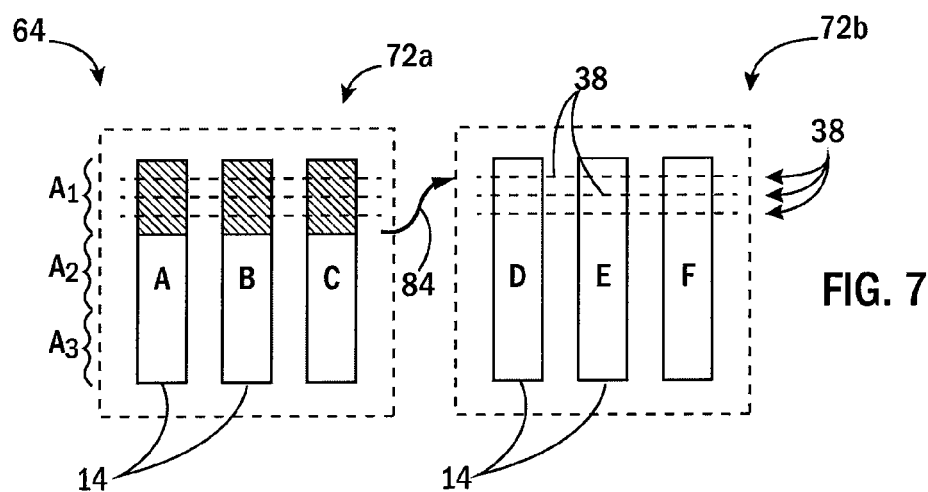
FIG. 7 is a data structure showing execution thread jumps between preloaded data structures based on early calculation pruning with the data arrangement for vertical bit parallel structures.

Referring now to FIG. 7, a different pre-packing process may be used by the data preprocessor 21 to create a VBP structure 64. This example considers the same data elements 14 in the same column order as shown in FIG. 5 following the logical ordering of the database structure 12. In this case, the data preprocessor 21 arranges each of the data elements 14 into segments 72 holding k data words 38 where k is again equal to the length of the data elements 14. The data elements 14 are stored "vertically" in the segments 72 so that a first data word 38 holds only the highest order bits of multiple data elements 14, the second data word 38 holds the next highest order bit and so on. This means that each data word 38 holds bits of a single order from multiple data elements 14.

Figure 8:
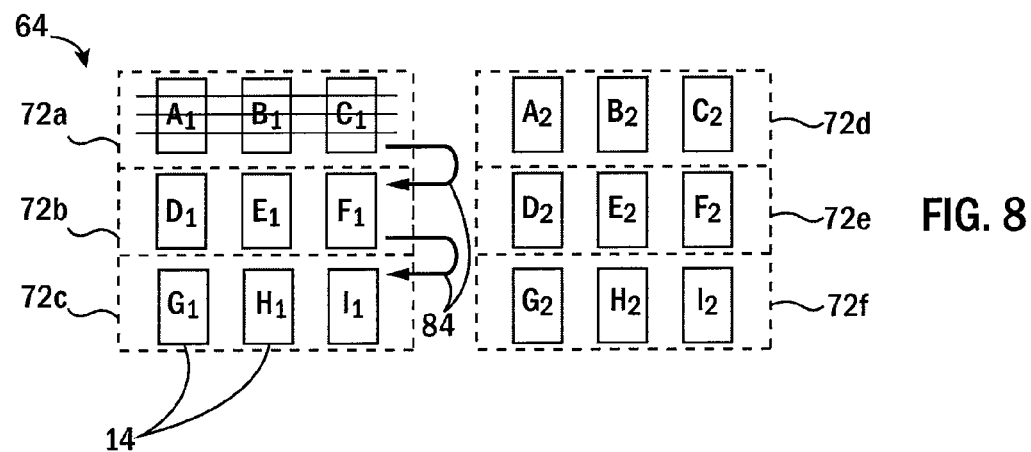
FIG. 8 is a figure similar to FIG. 7 showing an alternative data structure for reducing memory bandwidth during early calculation pruning.

Referring to FIG. 8, pseudocode for bit-parallel execution of a query condition on the data words 38 of the VBP structure 64 is provided below in TABLE II. In this case the query condition is Whether a given data element 14 (designated c in the pseudocode) falls within a range defined by constants C1 and C2. This bit-parallel processing again utilizes the full width of the processor word of the ALU 52 in order to simultaneously process data of multiple data elements 14.

TABLE II

Input: a predicate C1 < c < C2 on column c
Output: $BV_{out}$: result bit vector TABLE II-continued

```
1: for i := 1...k do
2:      if i-th bit in C1 is one then
3:          C1_i := 1^w
4:      else
5:          C1_i := 0^w
6: for i := 1...k do
7:      if i-th bit in C2 is one then
8:          C2_i := 1^w
9:      else
10:         C2_i := 0^w
11: for each segment s in column c do
12:     m_lt, m_gt := 0
13:     m_eq1, m_eq2 := 1^w
14:     for i := 1...k do
15:         m_gt := m_gt ∨ (m_eq1 ∧ ¬ C1_i ∧ s.v_i)
16:         m_lt := m_lt ∨ (m_eq2 ∧ C2_i ∧ ¬ s.v_i)
17:         m_eq1 := m_eq1 ∧ ¬ (s.v_i ⊕ C1_i)
18:         m_eq2 := m_eq2 ∧ ¬ (s.v_i ⊕ C2_i)
19:     append m_gt ∧ m_lt to BV_out
20: return BV_out
```

In these computations ∧ represents a bit wise AND function, ∨ represents a bit wise OR function, ¬ represents a logical bit wise NOT function, ⊕ represents a bit wise exclusive OR function, and $sv_i$ represents the ith bit of the given data word 38 being processed and terms such as $1^k$ represent a padded binary value having a bit repetition equal to the number of the exponent (e.g., $1^4$=1111).

In this process, multiple arguments for register 51 are first created related to the two constants C1 and C2 which essentially duplicate the bits of each order of each constant for a vector equal to the length of the data word 38. Thus, for example, if constant C1 is 101 and the data word 38 is eight bits long, three arguments are created of 11111111, 0000000, and 1111111. This process is shown in lines 1 through 10.

Next, at lines 11 through 18, bit vectors $m_{gt}$, $m_{lt}$, $m_{eq1}$, and $m_{eq2}$ are created having length equal to the data words 38, the former two set to all zero values and the latter two set to all one values. Then, for each of the k data words 38 of the segment 72, the computations of lines 15-18 are performed.

As before, a bit vector having a length equal to the length of the data words 38 is ultimately produced with bits set or reset to indicate whether corresponding data elements 14 meet the query condition.

The algorithm for evaluating range conditions on horizontal organization of data at bit led is described in the paper P. E. O'Neil and D. Quass. "Improved query performance with variant indexes" SIGMOD, 38-49, 1997 hereby incorporated by reference.

Figure 6:
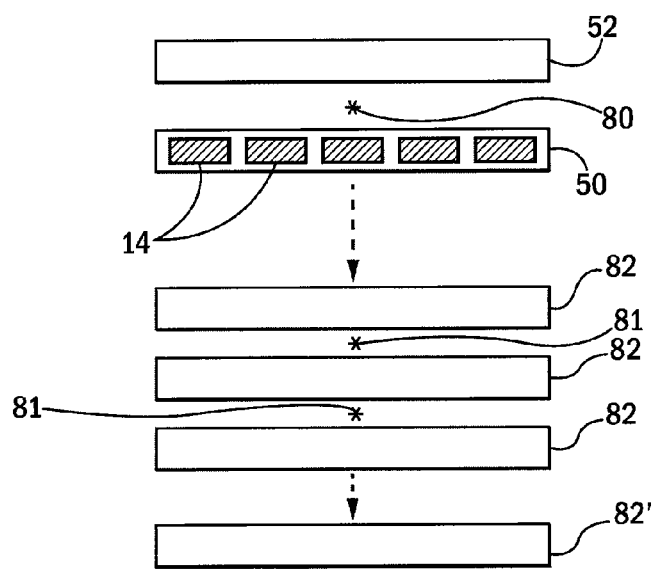
FIG. 6 is a block diagram showing common elements of bit parallel processing used with the structures of both FIGS. 4 and 5.

Referring now to FIG. 6 it will be appreciated that both the HBV and VBP processing allows one of the ALU registers 50 representing a data word 38 equal to the processing word to be efficiently filled with data from multiple data elements 14 that may be simultaneously processed by one or more operators 80 using arguments stored in register 51 related either to the query condition or an intermediate step. The result is a bit wise parallel operation on multiple data elements 14. In both cases a bit vector 82 is returned, efficiently representing the results of the query and also efficiently using the full width of the data word 38 equal to the processing word by proper selection of the segment sizes.

This basic technique may be extended to multicolumn predicates by further operation on multiple bit vectors 82. For example, a bit vector 82 may be created for a given column 16 of the database structure 12 (shown in FIG. 1) for multiple database columns 16 with each bit of the bit vector 82 indicating if the corresponding data value was selected to be in the result. Conjunction and disjunction among columns may be implemented as logical AND and OR operations on these bits of these bit vectors to produce a result bit vector 82 that may be part of a list of row identification values, which is then used to retrieve rows of interest for this query.

Consider, for example, for the query:
Select R.a, R.c
From R
Where R.a<X and R.b>Y and R.c=Z.

In this example, R.a represents column a of database table R, R.b represents column b of database table R and so forth.

In a first step, the above techniques may be used to evaluate R.a<X on R.a, outputting a hit vector V1. Next R.b>Y on R.b may be evaluated outputting a bit vector V2 and R.c=Z on R.c, outputting a bit vector V3. Finally, at the conjunction of these conditions a bit vector 82' of V may be obtained by a logical AND of the bit vectors 82 for V1, V2 and V3 (only two shown in FIG. 6). All the values of is in the bit vector V are then transformed into a list of row IDs, which is then used to retrieve the matching values in the columns R.a and R.c.

Early Pruning

Referring now to FIG. 7, it will be appreciated, that as the process of TABLE II proceeds through the data words 38 from highest order bits to lowest order bits of the multiple data elements 14, the result may be apparent before the process is complete. For example, if the query condition is ≤3, it will be apparent after analysis of the first data words 38 holding the highest order bits, that data elements 2, 3, 5, 6, and 8 do not meet these conditions and the remaining data elements do and that the remaining calculations will not change this result. More generally, the results of applying the query condition will often be apparent after processing of a subset of the data words 38 of the segments 72.

In cases when application of the query condition to all of the data elements 14 of the segment 72 are fully resolved before completion of analysis of all of the data words 38 of the segment 72, the calculation may be halted, the remaining instructions skipped (pruned) and a new segment 72 examined with substantial time savings.

Referring now to FIG. 7 this early pruning allows an additional optimization to be performed by the data preprocessor 21 with respect to dividing the data of data elements 14 among different segments 72. In FIG. 7 a first segment 72a may hold data elements 14 designated as A, B, and C stored in VBP structure 64 as discussed above and a second segment 72b may store data elements 14 designated as D, F, and F also stored as a VBP structure 64. If during the processing of segment 72a, it is possible to prune the calculation after only the initial data words 38 are analyzed (these initial data words 38 indicated by the shaded elements of the data elements 14), then the bit-parallel processor 26 may perform a jump 84 to the next segment 72b. In the event that the next segment 72b is a different cache block or line) than is segment 72a, this jump 84 wastes memory bandwidth through the need to load new data into the cache and discard existing cached data without use of that data.

Referring now to FIG. 8 this wasted memory bandwidth may be reduced by having the data preprocessor 21 reorder the data elements 14 within the segments 72a and 72b in the manner that anticipates possible early pruning. For example, if is anticipated that early priming will occur in most cases before this analysis of the third data word 38, then, only the highest three orders of bits of the multiple data elements 14 can be enrolled in segment 72a, that is, the first three orders of bits for data elements 14 of A, B, and C tin the first three data words 38). These first three data words 38 may be followed by segment 72*b* with data words 38 holding the three orders of bits for new data elements 14 of D, E, and F, where segments 72*a* and 72*b* are in contiguous memory locations. Under this arrangement, the jump 84 resulting from pruning remains within contiguous memory accesses improving the efficient use of memory bandwidth. Note that this benefit occurs for any early pruning after the first, second, or third data word 38 calculation and, accordingly, the estimate of pruning need not be precise. If this anticipated early pruning does not occur, a jump to segment 72*d* of a noncontiguous segment must occur, but can still be performed with a minor access penalty.

Accordingly, the data preprocessor 21 may evaluate the trade-off between inter-segment jumps 84 and intra-segment jump 84 with respect to processing speed to further adjust the organization of the data elements 14 in physical memory. In this respect, the data preprocessor 21 may receive from the user a pruning assumption, or may empirically vary the amount of pruning assumption, evaluate its result on process efficiency, and adjust this amount during run-time.

Order means the exponent of base two related to a position of the bit in a binary word according to a lowest order, matching a least significant bit at a highest order matching a most significant bit of the binary word.

Referring again to FIG. 3, in selecting between HBV and VBP, the data preprocessor 21 may consider the following trade-offs:

Scan Complexity.

HBP uses k+1 bits of data word to store a k-bit code, while VBP requires only k bits. The data preprocessor 21 may evaluate pre-ordering efficiency by monitoring the execution time of the reordering to determine the best choice for reordering the data of the database structure 12 for a given pattern of queries The implementation of the HBP method relies on arithmetic and shift operations, which are not supported on single instruction multiple data (SIMD) words used in some current processors. For this reason, HBP has to pad codes to the width of banks in the SIMD registers, rather than the SIMD word width. This leads to underutilization of the full width of the SIMD registers. In contrast, the VBP method achieves the full parallelism that is offered by SIMD instructions. Accordingly the data preprocessor 21 may select VBP for SIMD devices.

Applying the early pruning technique on HBP requires extra processing that hurts the performance of HBP. As a result, HBP does not employ the early pruning technique. In contrast, in VBP, the early pruning technique works naturally with the underlying VBP-like format with no extra cost, and thus improves the scan performance. The data preprocessor 21, again, therefore monitors pruning statistics and varies between VBP and IMP to determine an optimum setting.

Lookup Performance.

With the HBP storage layout, it is easy to fetch a code because all the bits of the code are located together. In contrast, for VBP, all the bits of a code are distributed into various bit groups, across different words. Assembling a code requires access to data across multiple locations which incurs many CPU cache misses, and thus may hurt performance. Accordingly the data preprocessor 21 may monitor cache misses to select between VBP and HBP.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context. The terms "vertical" and "horizontal" with respect to data storage refer only to the hardware enforced data access preference, with horizontal data being accessed in a single unit.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a computer system" can be understood to include one or more processors or cores that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

The term "data word" does not denote a particular number of bits but rather an increment of data related to its processing by hardware or storage in memory as will be apparent from context.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A database system comprising:
a data storage device for holding database data elements;
a processor in communication with the data storage device, the processor executing a stored program held in a non-transient medium to:
(a) receive input indicating a projected type of database activity to be conducted on the database elements:
(b) based on the received input, read the database data elements from a first memory structure in memory and reorganize the database data elements in a second memory structure in memory in a selected one of a horizontal bit parallel structure and vertical bit parallel structure as determined from the received input;
wherein the horizontal bit parallel structure provides multiple logical rows and columns and organizes multiple data elements in each logical row, where the logical row may be receivable in its entirety by an arithmetic logic unit of the processor for execution by the arithmetic logic unit of bits of the multiple data elements in parallel; and wherein the vertical bit parallel structure provides multiple logical rows and columns and organizes multiple data elements in multiple logical columns so that bits only of a single order of the organized data elements are in each logical row, where the logical row may be receivable in its entirety by an arithmetic logic unit of the processor for execution by the arithmetic logic unit of all of the bits of the single order of the multiple data elements in parallel; and (c) execute queries on multiple data elements in parallel by bit-parallel processing of the multiple logical rows of data using the arithmetic logic unit.

2. The database system of claim 1 wherein, the queries evaluate query conditions of equals, not equals, greater than, less than, greater than or equal, less than or equal, and between with respect to at least one query value.

3. The database system of claim 2 wherein the bit parallel processing of the query applies to at least one argument of a length matching a length of the logical row to data of multiple data elements, simultaneously, to all data elements in the logical row.

4. The database system of claim 3 wherein the bit-parallel processing generates a result of length equal to the length of the logical row and having a single bit corresponding to each data element of the logical row and indicating whether the data element meets the query condition.

5. The database system of claim 1 wherein the data elements, when organized in a horizontal bit parallel structure, are organized in a logical row with bits in a sequence according the order of the bit with all bits of each data element preceded by a delimiter bit.

6. The database system of claim 5 wherein multiple adjacent data elements when organized in a horizontal bit parallel structure are not sequential in a database order of the data in the logical row.

7. The database system of claim 6 wherein the multiple adjacent data elements within a data word are each k+1 greater in database order from a previous data element where k is a bit length of the data elements.

8. The database system of claim 1 wherein the data elements when organized in a vertical bit parallel structure are arranged in adjacent logical columns so that bits of sequential data elements are in database order in the logical row.

9. The database system of claim 1 wherein the bit parallel processing of the queries uses only operations that do not require bit carry or bit shifting.

10. The database system of claim 1 wherein the bit parallel processing of the vertical bit parallel structure by the queries sequentially processes logical rows holding the more significant bits of the data elements and proceeds in order toward processing logical rows holding less significant bits of the multiple data elements and wherein the bit parallel processing stops before evaluation of a query condition on all logical rows of given data elements in cases when applying an argument to a current logical row precludes a possibility of the query condition being met in the processing of later logical rows.

11. The database system of claim 10 wherein the processor executes the stored program to monitor the stopping before evaluation of a query condition on all logical rows of given data elements to selectively separate ranges of bit orders of the multiple data elements of the logical words into separately pre-loadable increments of data so that an earlier stopping causes a separation into a smaller range of bit orders and a later stopping causes a separation into a larger range of bit orders.

12. A database system comprising:
a data storage device for holding database data elements; and
a processor in communication with the data storage device, the processor executing a stored program held in a non-transient medium to:
(a) pre-process database data elements from a first memory structure in memory to reorganize the database data elements in a second memory structure in memory in a horizontal bit-parallel structure providing multiple logical rows and columns and organizing multiple data elements in each logical row, where the logical row may be receivable in its entirety by an arithmetic logic unit of the processor for execution by the arithmetic logic unit of bits of the multiple data elements in parallel; and
(b) execute queries on multiple data elements in parallel by bit-parallel processing of the multiple logical rows of data using the arithmetic logic unit.

13. The database system of claim 12 wherein the data elements are organized in a logical row with bits in a sequence according to an order of the bit with all bits of each data element preceded by a delimiter bit.

14. The database system of claim 12 wherein multiple adjacent data elements are not sequential in a database order of the data in the logical row.

15. The database system of claim 14 wherein the multiple adjacent data elements within a data word are each k+1 greater in database order from a previous data element where k is a bit length of the data elements.

16. A database system comprising:
a data storage device for holding database data elements; and
a processor in communication with the data storage device, the processor executing a stored program held in a non-transient medium to:
(a) pre-process database elements from a first memory structure in memory to reorganize the database data elements in a second memory structure in memory in a vertical bit parallel structure wherein the vertical bit parallel structure provides multiple logical rows and columns and organizes multiple data elements in multiple logical columns so that bits only of a single order of the organized data elements are in each logical row, where the logical row may be receivable in its entirety by an arithmetic logic unit of the processor for execution by the arithmetic logic unit of all of the bits of the single order of the multiple data elements in parallel; and
(c) execute queries on multiple data elements in parallel by bit-parallel processing of the multiple logical rows of data using the arithmetic logic unit.

17. The database system of claim 16 wherein the data elements when organized in a vertical bit parallel structure are arranged in adjacent logical columns so that bits of sequential data elements are in database order in the logical row.

18. The database system of claim 16 wherein the bit parallel processing of the query uses only operations that do not require bit carry or bit shifting.

19. The database system of claim 16 wherein the bit parallel processing of the vertical bit parallel structure by the queries sequentially processes logical rows holding the more significant bits of the data elements and proceeds in order toward processing logical rows holding less significant bits of the multiple data elements and wherein the hit parallel processing stops before evaluation of a query condition on all logical rows of given data elements in eases when applying an argument to a current logical row precludes a possibility of the query condition being met in the processing of later logical rows.

20. The database system of claim 19 wherein the processor executes the stored program to monitor the stopping before evaluation of a query condition on all logical rows of given data elements to selectively separate ranges of bit orders of the multiple data elements of the logical words into separately pre-loadable increments of data so that an earlier stopping causes a separation into a smaller range of bit orders and a later stopping causes a separation into a larger range of bit orders.

* * * * *